United States Patent [19]

Eisenman

[11] 4,230,360
[45] Oct. 28, 1980

[54] BULK MATERIAL BED

[76] Inventor: Leonard J. Eisenman, Box A, Eisenman Rd., Boise, Id. 83706

[21] Appl. No.: 17,946

[22] Filed: Mar. 6, 1979

[51] Int. Cl.³ .............................................. B62D 27/00
[52] U.S. Cl. .................................. 296/181; 105/407; 298/24
[58] Field of Search .................... 296/181; 298/24; 105/407, 411, 406 R, 404, 396; 280/789

[56] References Cited

U.S. PATENT DOCUMENTS

| 401,530 | 4/1889 | Zurcher | 105/248 |
|---|---|---|---|
| 2,250,262 | 7/1941 | Hili | 298/24 |
| 2,428,533 | 10/1947 | Simmons | 298/35 |
| 3,856,354 | 12/1974 | Davis | 298/24 |
| 4,003,301 | 1/1977 | Norton | 98/13 |

Primary Examiner—John J. Love
Assistant Examiner—John A. Carroll

Attorney, Agent, or Firm—Wells, St. John & Roberts

[57] ABSTRACT

A trailer for receiving and hauling bulk material. The trailer includes an elongated bed with an external skeletal frame. Along with the skeletal frame, two truss members are provided on opposite longitudinal sides of the bed. Each truss includes downwardly converging truss members that are affixed at opposite upper ends to the horizontal top rail of the skeletal frame. The truss members converge downwardly to ends that meet at points below the bottom wall of the bed. These ends are affixed to one another and are situated at the approximate longitudinal center of the trailer. Upright web members extend between the top rails and truss members at longitudinally spaced locations along the trailer. A transverse tie member is also provided extending between the joined lower ends of the truss members across the width of the trailer below the bottom wall of the bed.

16 Claims, 3 Drawing Figures

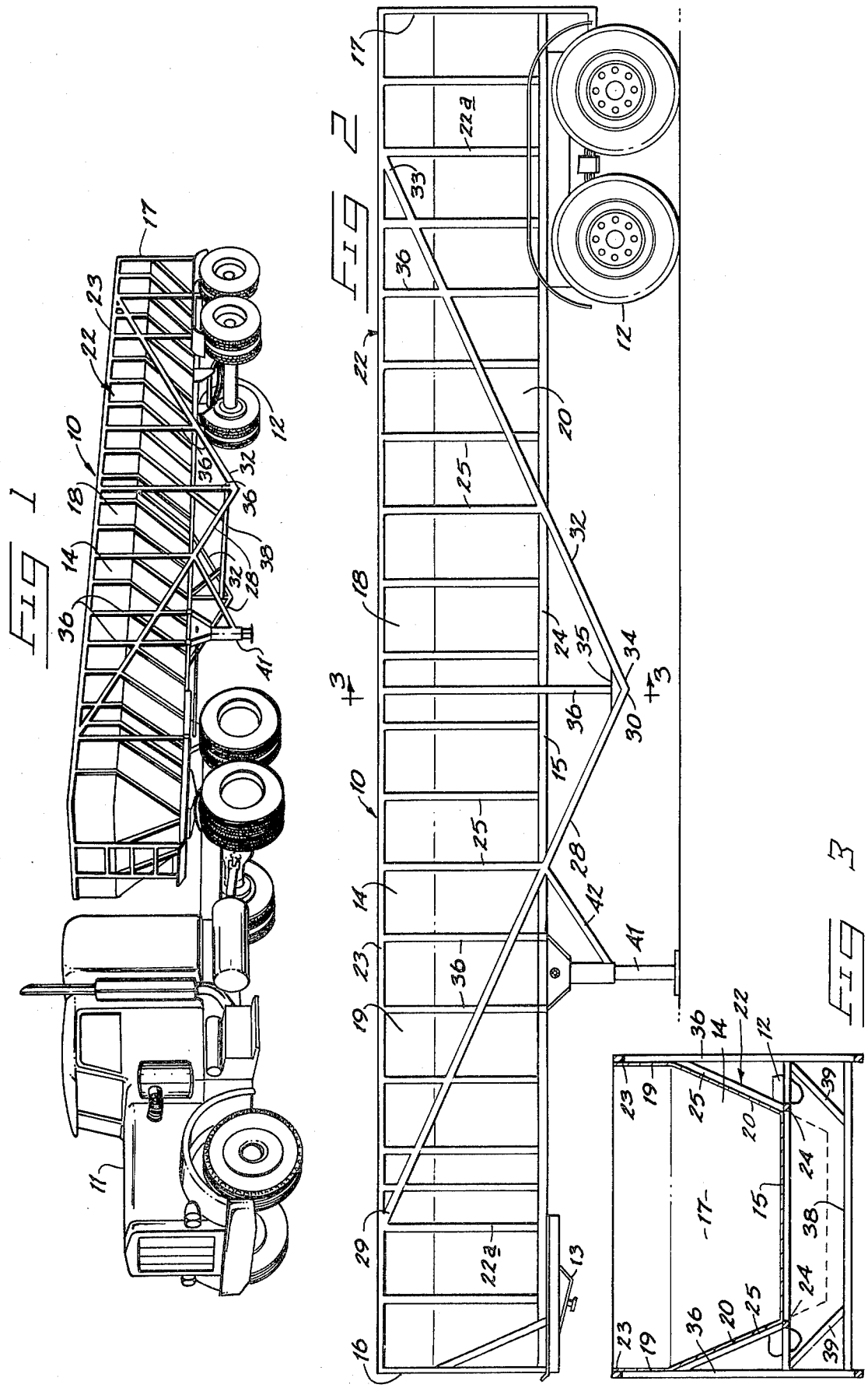

BULK MATERIAL BED

BACKGROUND OF THE INVENTION

The present invention is related to bulk material supporting apparatus.

Conventional bulk material beds on vehicles such as trucks or trailers have very heavy frameworks to assure that the beds will not fatigue and collapse under loaded conditions. Since the framework adds to the total weight of the bed as a unit, it is desirable to keep the amount and size of frame components utilized to a minimum in order to provide a lightweight bed providing the bulk carrying capacity needed. Excessive framework adds substantially to the total weight of the bed and therefore decreases its hauling capacity due to weight limitations encountered under regulations limiting usage of such equipment. The weight of such framework also reduces fuel economy of towing vehicles whether the bed is loaded or unloaded.

Previous bulk material carriers have been designed with a network of external frame members arranged in a truss-like fashion. However, the frame members have always been an integral part of the bulk material bed and are therefore confined or restricted to the physical dimensions of the bed. Such beds are often relatively shallow and substantially elongated. By confining the support framework to engagement with the bed, a certain amount of longitudinal rigidity is sacrificed. This is made up for by adding frame members, thereby increasing the unit weight of the carrier.

It therefore becomes desirable to obtain some form of bulk material carrier that is lightweight in construction and yet provides load carrying capacities similar to that of conventional carriers. It is also desirable to provide a bulk material carrier with an external skeletal framework that will provide longitudinal rigidity to the bulk material bed.

BRIEF DESCRIPTION OF THE DRAWINGS

FIG. 1 is a pictorial view of a truck and a trailer embodying the principal features of the present invention;

FIG. 2 is a side elevational view of the present trailer; and

FIG. 3 is a cross-sectional view of the trailer taken on a plane 3—3 in FIG. 2 with the wheel carriage broken away.

DETAILED DESCRIPTION OF A PREFERRED EMBODIMENT

The present invention is designated generally by the reference character 10 in the accompanying drawings. In FIG. 1, a carrier or trailer embodiment of my invention is shown connected to a tractor 11 which may provide wheeled support means for a forward end of the trailer. A wheeled carriage 12 is provided as means for movably supporting the rearward end of the bed. A hitch member 13 of conventional form is supplied at the forward end of the bed that is adapted for connection to a tractor 11. The front of the trailer need not have a conventional hook-up to the tractor. The trailer could be provided with a forwardly protruding tongue (not shown) to be pulled as a pull type trailer behind the tractor or another trailer. Then, the trailer could include, as movable support means, a forward wheeled carriage like carriage 13.

The trailer 10 includes an elongated upwardly open bed 14. The bed 14 receives and supports bulk material of any selected variety. It has been found that the trailer is particularly suited to receive and transport bulk produce since it can easily be adapted to mount bottom bin discharge units or an elongated discharge conveyor situated within the bottom of the bin for delivering the bulk material outwardly through an opening at the rearward end. An example of such a discharge is described in U.S. Pat. No. 4,055,265 granted Oct. 25, 1977 to applicant.

The bed 14 is illustrated in substantial detail by FIGS. 2 and 3. It includes an upright front wall 16 and a longitudinally spaced rear wall 17. A bottom wall 15 extends horizontally and longitudinally between the front and rear walls 16 and 17. The elongated side walls 18 also extend between walls 16 and 17 and are joined to the bottom wall 15 to present an upwardly open container.

The elongated side walls 18 each include parallel upright wall sections 19. Inclined converging wall sections 20 extend downwardly from the sections 19. The wall sections 20 converge downwardly to the bottom wall 15. This particular configuration is particularly suited to the receiving and hauling of produce and for discharging the produce with appropriate mechanisms as described briefly above.

A support means is provided to maintain structural integrity of the bed. It may include a skeletal frame 22 that conforms to the outside configuration of the side walls 18 and walls 16 and 17. Frame 22 defines support columns 22a above the carriage 12 and hitch member 13.

A rigid top rail 23 extends about the entire periphery of the bed at an upper side thereof. The top rail is parallel to and spaced upwardly from a horizontal bottom rail 24. Bottom rail 24 extends about the bottom wall 15 at lower edges of the converging wall sections 20. Upright rails 25 connect the rails 23 and 24 conforming to the wall sections 19 and 20.

Substantially increased longitudinal rigidity of the bed is provided by a pair of truss arrangements, located on opposite longitudinal sides of the bed. Each arrangement includes a first diagonal truss member 28 as illustrated in FIG. 2. Member 28 is rigid along its length. It includes an end 29 affixed to the top rail 23 almost directly above the hitch member 13 within column 22a. The truss member 28 extends downwardly from end 29 to an end 30 below the bottom wall 15.

A second rigid diagonal truss member 32 is also shown in FIG. 2. It includes an end 33 affixed to the top rail 23 nearly directly above the wheel carriage 12 in a column 22a. It extends downwardly and forwardly to a bottom end 34. Structural means 35 is provided to rigidly connect the ends 34 together. This forms triangular trusses with the top rails 23 and members 28, 32 and structural means 35 as the component elements.

The truss members 28 and 32 are situated, as may be noted in FIG. 3, in a vertical plane outwardly adjacent to the planes of the respective upright wall sections 19. They form acute angles with the inclined converging wall sections 20.

Means 35 may include at least one web member 36 for each pair of truss members 28 and 32, interconnecting the members with the top rail 29. Preferably several of the vertical rigid members 36 are supplied individually extending between the top rail and truss members at longitudinally spaced locations along the bed. Several of these members 36 are illustrated in FIG. 1.

FIGS. 1 and 3 illustrate a transverse tie member 38 which may also be included as an element of structural means 35. Member 38 extends between the pairs of truss members 32 and 34. The tie member 38 is horizontal and situated elevationally below the bottom wall 15. It may be braced as at 39 to one or more web members 36 to provide lateral rigidity to the framework. Additional braces 42 may be provided to stabilize additional supportive equipment such as the jacks illustrated at 41.

With the distance from the top rail to the lowest point of the truss members being greater than the depth of the bed, I am able to construct the trailer utilizing less structural material. The truss arrangements may be likened somewhat to an underslung bridge. The support columns 22a are at opposed ends of the bed and the truss members 28 and 32 converge substantially from these points. The top rail and the central upright web members operate under load to place members 28 and 32 under tension. The angles formed between the top rail and members 28, 32 are substantially greater than they would be if the ends 30 and 34 were joined at the elevation of bottom wall 15. This increased angle causes more of the load to be carried by members 28 and 32 under tension, and reduces the bending load on horizontal rails 23 and 24. Increased lateral rigidity is provided through the rigid members 28 and 32 and by transverse tie member 38. A strong, yet lightweight, trailer results from the described arrangement. I have found the present trailer may be as much as one thousand pounds lighter than a similar conventional trailer and yet maintain the same load carrying capacity. This substantially reduces the loaded weight of the trailer and will reduce drag and weight of the empty trailer on the return haul.

The above description and attached drawings are given by way of example to set forth a preferred form of the present invention. It is understood that various changes and modifications may be made therein. Therefore, only the following claims are to be taken as limitations upon the scope of my invention.

What I claim is:

1. A bulk material bed comprising:
   parallel elongated side walls joined on opposite ends by front and rear end walls and a bottom wall joining lower edges of the side and end walls;
   horizontal top rails extending along the elongated side walls;
   first diagonal truss members each affixed at a top end to a top rail adjacent the front end wall and extending therefrom angularly downward to a bottom end elevationally below the bottom wall and located adjacent the longitudinal center of the bed;
   second diagonal truss members each affixed at a top end to a top rail adjacent the rear end wall and extending therefrom angularly downward to a bottom end elevationally below the bottom wall of the bed and located adjacent the longitudinal center of the bed;
   structural means operatively connecting the respective bottom ends of said first and second diagonal truss members to one another; and
   web members interconnecting the top rails and said truss members.

2. The bed as defined by claim 1 wherein a plurality of said web members extend between said top rails and said truss members and wherein said top rails, web members and truss members are disposed in parallel vertical planes.

3. The bed as defined by claim 1 wherein said elongated said walls include:
   upright parallel wall sections extending along the top rail;
   inclined, converging wall sections joining the upright sections and bottom wall; and
   wherein the truss members on each side wall are oriented in vertical planes adjacent the respective side walls and form acute angles with said converging wall sections thereof.

4. The bed as set out by claim 1 wherein the structural means comprises a tie member extending elevationally below the bottom wall to laterally interconnect truss members on one elongated side wall to the truss members on the remaining elongated side wall.

5. The bed as set out by claim 1 wherein the structural means comprises a tie member extending elevationally below the bottom wall to laterally interconnect truss members adjacent one elongated side wall to the truss members adjacent to the remaining elongated side wall.

6. The bed as set out by claim 1 further comprising a skeletal frame adjacent to the rear end wall and front end wall, defining forward and rearward support columns and wherein the top end of each of said second diagonal truss member is affixed to the top rail within one of the support columns;

7. A bulk material carrier, comprising:
   an elongated bed including parallel elongated side walls joined on opposite ends by front and rear end walls and a bottom wall joining lower edges of the side and end walls;
   support means adjacent the front and rear end walls for moveably holding the bed above the ground surface;
   top rails extending along the elongated side walls from the front end to the rear end of the bed;
   first diagonal truss members, each affixed at a top end thereof to a top rail above the support means at the front wall and extending downwardly and rearwardly therefrom to bottom ends situated intermediate the bed ends and elevationally below the bottom wall;
   second diagonal truss members, each affixed at a top end thereof to a top rail above the moveable support means at the rear wall and extending downwardly and forwardly to a bottom end situated intermediate the bed ends and elevationally below the bottom wall;
   structural means rigidly interconnecting the bottom ends of the first and second truss members.

8. The carrier as defined by claim 7 wherein the structural means includes web members interconnecting each top rail with its connected truss members.

9. The carrier as defined by claim 7 wherein the structural means includes a transverse tie member extending elevationally below the bottom wall to laterally interconnect the truss members on one elongated side wall to the truss members on the remaining side wall.

10. The carrier as defined by claim 7 wherein the structural means includes a rigid upright web member for each elongated top rail extending downwardly therefrom to a lower end joining the bottom ends of the truss members.

11. The carrier as defined by claim 10 further comprising a transverse tie member extending elevationally below the bottom wall to laterally interconnect the truss members on one elongated side wall to the truss members on the remaining side wall.

12. The carrier as defined by claim 7 wherein each of the top rails and connected truss members are coplanar and are arranged in parallel vertical planes.

13. The carrier as defined by claim 12 wherein said elongated side walls include:
   upright parallel wall sections extending along said top rails;
   inclined converging wall sections joining the upright sections and bottom wall; and
   wherein the truss members form acute angles with said converging wall sections.

14. A bulk material trailer, comprising:
   an elongated bed formed of parallel elongated side walls joined on opposite ends by front and rear end walls and a bottom wall joining lower edges of the side and end walls;
   a wheeled carriage moveably supporting the bed adjacent the rear end walls;
   a hitch member located adjacent the front end wall, adapted to connect the trailer to a towing vehicle;
   an exterior skeletal frame at the front and rear ends forming support columns above the wheeled carriage and hitch member;
   elongated rigid top rails extending along the side walls from the support columns at the front end to the support columns at the rear end wall;
   first rigid diagonal truss members, each affixed at a top end thereof to a top rail and skeletal frame above the hitch member and extending downwardly and rearwardly therefrom to bottom ends situated intermediate the front and rear ends and elevationally below the bottom wall;
   second rigid diagonal truss members, each affixed at a top end thereof to a top rail and skeletal frame above the wheeled carriage and extending downwardly and forwardly therefrom to a bottom end situated intermediate the bed ends and elevationally below the bottom wall;
   wherein the first and second truss members and associated top rails are oriented in parallel vertical planes on opposite side walls of the bed;
   structural means rigidly interconnecting the bottom ends of the truss members elevationally below the bottom wall of the bed; and
   an upright rigid web member for each top rail, each extending vertically from a top rail to the structural means.

15. The trailer as defined by claim 14 wherein the structural means includes a transverse tie member extending elevationally below the bottom wall to laterally interconnect the truss members on one elongated side wall to the truss members on the remaining side wall.

16. The trailer as defined by claim 14 wherein said elongated side walls include:
   upright parallel wall sections extending along said top rails;
   inclined converging wall sections joining the upright sections and bottom wall; and
   wherein the truss members form acute angles with said converging wall sections.

* * * * *